(12) United States Patent
Chow

(10) Patent No.: US 11,108,640 B2
(45) Date of Patent: Aug. 31, 2021

(54) CONTROLLING DEVICES IN A DECENTRALIZED STORAGE ENVIRONMENT

(71) Applicant: Advantest Corporation, Tokyo (JP)

(72) Inventor: Eddy Wayne Chow, San Jose, CA (US)

(73) Assignee: Advantest Corporation, Tokyo (JP)

( * ) Notice: Subject to any disclaimer, the term of this patent is extended or adjusted under 35 U.S.C. 154(b) by 0 days.

(21) Appl. No.: 16/227,479

(22) Filed: Dec. 20, 2018

(65) Prior Publication Data

US 2020/0204447 A1    Jun. 25, 2020

(51) Int. Cl.
*H04L 12/24* (2006.01)
*H04L 29/08* (2006.01)
*G06F 13/42* (2006.01)

(52) U.S. Cl.
CPC .......... *H04L 41/12* (2013.01); *G06F 13/4221* (2013.01); *H04L 67/1097* (2013.01); *G06F 2213/0026* (2013.01)

(58) Field of Classification Search
CPC . H04L 41/12; H04L 67/1097; G06F 13/4221; G06F 2213/0026
USPC ........................................................ 709/223
See application file for complete search history.

(56) References Cited

U.S. PATENT DOCUMENTS

| | | | | |
|---|---|---|---|---|
| 8,321,870 | B2* | 11/2012 | Messier | G06F 9/5066 709/201 |
| 9,672,073 | B2* | 6/2017 | Deschler | G06F 9/5066 |
| 10,212,740 | B2* | 2/2019 | White | H04W 76/10 |
| 10,289,797 | B1* | 5/2019 | Viswanathan | G06F 30/394 |
| 10,511,524 | B2* | 12/2019 | Zhang | H04L 41/044 |
| 10,557,886 | B2* | 2/2020 | Nahum | G01R 31/2834 |
| 2007/0174726 | A1 | 7/2007 | Nam et al. | |
| 2007/0234364 | A1* | 10/2007 | Lipton | G06F 9/5066 718/102 |
| 2008/0115143 | A1* | 5/2008 | Shimizu | G06F 9/5066 718/105 |

(Continued)

FOREIGN PATENT DOCUMENTS

| | | |
|---|---|---|
| JP | 10-83315 | 3/1998 |
| JP | 3192890 | 7/2001 |

(Continued)

OTHER PUBLICATIONS

Merriam-Webster's Collegiate Dictionary 788 (vt. def. 1) (10th ed. 1993) (Year: 1993).*

*Primary Examiner* — David P Zarka

(57) ABSTRACT

A method for controlling devices in a de-centralized storage environment comprises partitioning a plurality of devices in a network into a plurality of super-cells, wherein each super-cell comprises a subset of the plurality of devices. For each super-cell, a system controller is configured to nominate a device in the super-cell as a nucleus device, wherein the nucleus device in the super-cell controls member devices in the super-cell. The system controller is further configured to transmit commands associated with a specific task to the nucleus device and receive information from the nucleus device regarding performance of the specific task, wherein the information comprises information aggregated from the member devices of the super-cell associated with a performance of a respective portion of the specific task.

18 Claims, 10 Drawing Sheets

(56) References Cited

U.S. PATENT DOCUMENTS

| | | | |
|---|---|---|---|
| 2014/0236527 A1 | 8/2014 | Chan et al. | |
| 2015/0181165 A1* | 6/2015 | Iltus | H04N 7/15 348/14.09 |
| 2018/0359174 A1* | 12/2018 | Sella | H04L 45/121 |
| 2019/0342172 A1* | 11/2019 | Bower, III | H04L 41/0886 |
| 2020/0034132 A1* | 1/2020 | U | H04L 67/10 |

FOREIGN PATENT DOCUMENTS

| | | |
|---|---|---|
| KR | 20070047427 | 5/2007 |
| KR | 20160012982 | 2/2016 |

* cited by examiner

CONTROLLING DEVICES IN A DECENTRALIZED STORAGE ENVIRONMENT

FIELD OF THE INVENTION

The present disclosure relates generally to the field of automated test equipment and more specifically to techniques of controlling such equipment.

BACKGROUND OF THE INVENTION

Automated test equipment (ATE) can be any testing assembly that performs a test on a semiconductor wafer or die, an integrated circuit (IC), a circuit board, or a packaged device such as a solid-state drive (SSD). ATE assemblies may be used to execute automated tests that quickly perform measurements and generate test results that can then be analyzed. An ATE assembly may be anything from a computer system coupled to a meter, to a complicated automated test assembly that may include a custom, dedicated computer control system and many different test instruments that are capable of automatically testing electronics parts and/or semiconductor wafer testing, such as system-on-chip (SOC) testing or integrated circuit testing. ATE systems both reduce the amount of time spent on testing devices to ensure that the device functions as designed and serve as a diagnostic tool to determine the presence of faulty components within a given device before it reaches the consumer.

It is common for an ATE system to include a computer or system controller device that directs the operation of the ATE system. Typically, the computer runs one or more specialized software programs to provide (i) a test development environment and (ii) a device testing environment. In the test development environment, a user typically creates a test program, e.g., a software-based construct of one or more files that controls various portions of the ATE system. In the device testing environment, the user typically provides the ATE system with one or more devices for testing, and directs the system controller to test each device in accordance with the test program. The user can test additional devices by simply providing the additional devices to the ATE system, and directing the ATE system to test the additional devices in accordance with the test program. Accordingly, the ATE system enables the user to test many devices in a consistent and automated manner based on the test program.

Currently, if a set or array of SSD storage devices are being tested in an ATE system, each storage device is communicated with using a separate communication channel from the system controller to the device. This creates a large amount of traffic that needs to go through the primary communication channel coupled to the system controller. Typically this may be some kind of PCIE backbone. This can create a bottleneck at the primary communication junction at the system controller. Also, if the system controller is required to send the same command to each individual device in the set (to re-purpose the set, establish encryption, reset the devices, etc.) then the communication mechanism becomes inefficient as commands and data are duplicated and passed from the system controller to each device. This topology becomes very inefficient and creates channel bottleneck issues, which degrade overall system performance and effectiveness.

A similar issue also occurs in enterprise or other type of cloud based storage systems with centralized control systems. The market for cloud computing has increased significantly since the advent of streaming services, cloud storage services, social networking etc. Data is stored in data centers, which comprise a large group of networked servers for storage, processing, or distribution of large amounts of data. Data is stored in the clouding computing systems using an array of hard drives that are interconnected. Typical storage protocols currently used in the industry for the hard drives are NVMe, SAS and SATA. One of the problems with centrally controlled cloud computing systems is that traffic related to configuring and controlling the devices needs to be communicated in-band with traffic related to the data being stored. Typically, a control server will need to be able to communicate with each of the devices in the cloud based system in order to configure and control the devices. This results in decreased data bandwidth due to the overhead.

Furthermore, another challenge associated with conventional cloud computing systems is that if a device or hard drive within the cloud computing system fails or is undergoing maintenance, the information regarding the maintenance or failure is typically not communicated to the control server in a timely fashion. Alternatively, the control server may not adequate resources to respond to each device that is undergoing maintenance or failure in time. This makes conventional cloud computing systems less reliable.

BRIEF SUMMARY OF THE INVENTION

Accordingly, a need exists for a testing environment where the control of each device, e.g., an SSD device is distributed throughout the ATE framework. Further, what is needed is a test environment that can transmit commands to each of the devices in the ATE system without requiring a discrete channel between the system controller and each of the devices. Additionally what is needed is a cloud computing system wherein the configuration and control traffic is communicated out of band from the data traffic. Also, what is needed is a cloud computing system whereby data associated with a device can be easily accessed even during maintenance or failure. Using the beneficial aspects of the systems described, without their respective limitations, embodiments of the present invention provide a novel solution to address these problems.

Embodiments of the present invention address the drawbacks of conventional system by allowing a subset of hard drives (in an ATE framework or in a cloud computing system) to elect one of the devices (e.g., SSD devices) in the subset to be a nucleus or a sub-controller device. In other words, the entire ATE framework or cloud computing system comprises a number of subsets (also called "super cells") of devices, wherein a device in the super cell that is designated as the nucleus controls each subset or super cell.

In one embodiment, the nucleus is able to directly control and communicate with other devices in the super cell. This frees up the system controller from needing to control each device independently. The system controller, in one embodiment of the present invention, may direct instructions or data to the nucleus, which then is able to directly communicate commands, status, data or configuration information to or from the other devices of the super cell (in accordance with the instructions received from the system controller) without any of this information originating from the system controller. This alleviates the bottleneck issue and also any need for the system controller to duplicate commands directly to each hard drive of the super cell. Furthermore, because the nucleus will typically only control a subset of devices in the system and will be in close proximity to those devices, information regarding a failure or maintenance for any of those devices can be easily retrieved. Furthermore, the nucleus is more easily able to respond to a device in its super-cell that is undergoing failure or maintenance because of the proximity and low overhead (relative to the system controller).

A method for controlling devices in a de-centralized storage environment comprises partitioning a plurality of devices in a network into a plurality of super-cells, wherein each super-cell comprises a subset of the plurality of devices. For each super-cell, a system controller is configured to nominate a device in the super-cell as a nucleus device, wherein the nucleus device in the super-cell controls member devices in the super-cell. The system controller is further configured to transmit commands associated with a specific task to the nucleus device and receive information from the nucleus device regarding performance of the specific task, wherein the information comprises information aggregated from the member devices of the super-cell associated with a performance of a respective portion of the specific task.

A decentralized storage system comprises a system controller operable to partition a plurality of devices in a network into a plurality of super-cells, wherein each super-cell comprises a subset of the plurality of devices. The system further comprises a backbone operable to enable communication between the system controller and the plurality of super-cells. Further, the system comprises the plurality of super-cells, wherein each super-cell comprises a nucleus device nominated from member devices in the super-cell and configured to: (a) receive commands from the system controller associated with a specific task; (b) apportion the specific task between the member devices in the super-cell; (c) aggregate information from the member devices regarding a performance of the specific task; and (d) communicate the information to the system controller.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION OF THE INVENTION

Figure 1:
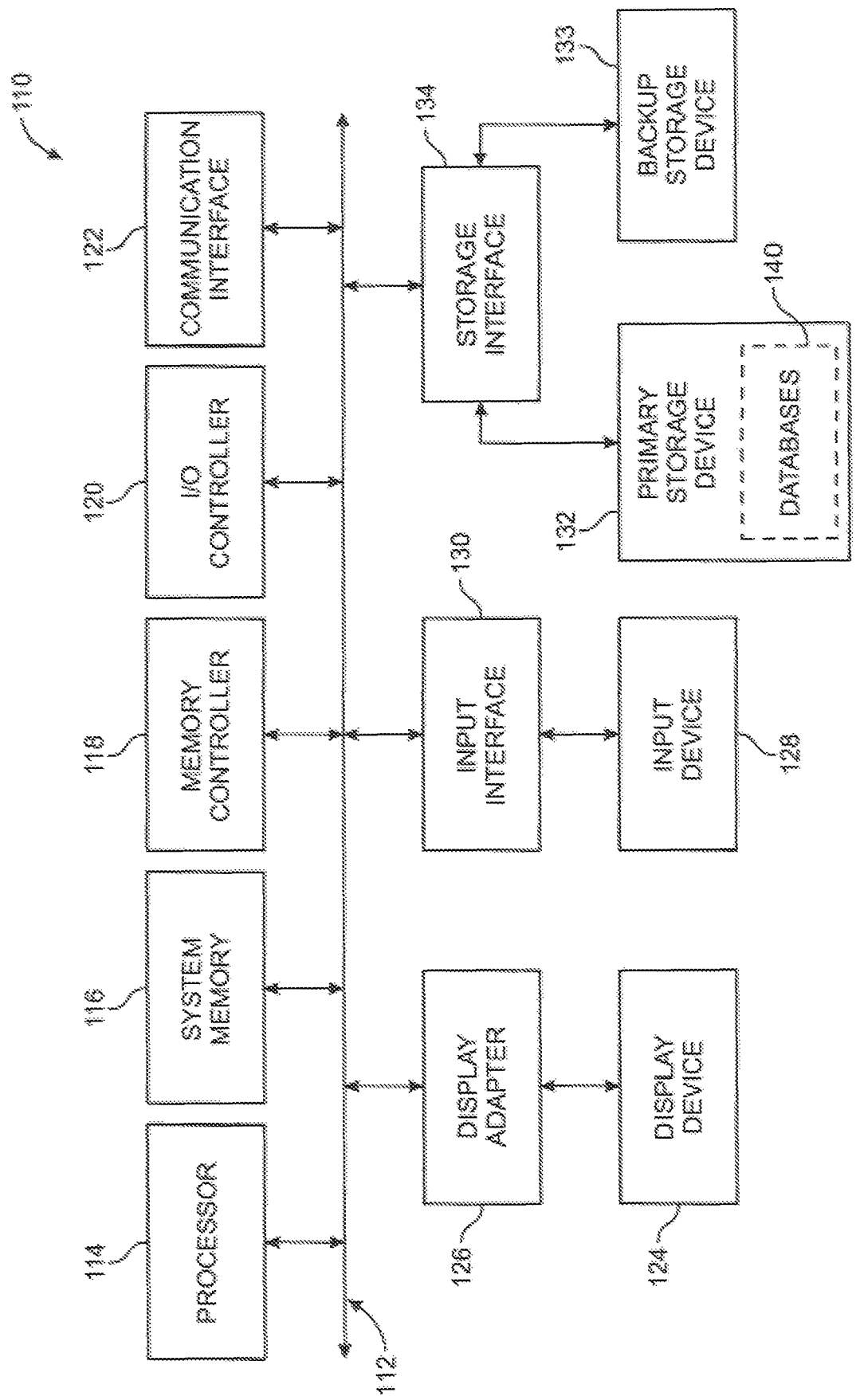
FIG. 1 is a computer system on which embodiments of the decentralized storage environment of the present invention can be implemented in accordance with one embodiment of the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "partitioning," "nominating," "transmitting," "receiving," "configuring," "providing," "executing," "obtaining," "implementing," "programming," "allocating," "associating," "setting," "accessing," "controlling," "determining," "identifying," "maintaining," "reading," "writing," or the like, refer to actions and processes (e.g., flowchart 900 of FIG. 9) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a computer system 110 on which embodiments of the decentralized storage environment of the present invention can be implemented in accordance with one embodiment of the present invention.

In an embodiment, system 110 may perform the function of the system controller (or control server). System 110 broadly represents any single or multi-processor computing device or system capable of executing computer-readable instructions. Examples of control system 110 include, without limitation, workstations, laptops, client-side terminals, servers, distributed computing systems, handheld devices, or any other computing system or device. In its most basic configuration, control system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments control system 110 may include both a volatile memory unit (such as, for example, system memory 116) and a non-volatile storage device (such as, for example, primary storage device 132).

Tester control system 110 may also include one or more components or elements in addition to processor 114 and system memory 116. For example, in the embodiment of FIG. 2A, control system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of control system 110. For example, memory controller 118 may control communication between processor 114, system memory 116, and I/O controller 120 via communication infrastructure 112.

I/O controller 120 generally represents any type or form of module capable of coordinating and/or controlling the input and output functions of a computing device. For example, I/O controller 120 may control or facilitate transfer of data between one or more elements of control system 110, such as processor 114, system memory 116, communication interface 122, display adapter 126, input interface 130, and storage interface 134.

Communication interface 122 broadly represents any type or form of communication device or adapter capable of facilitating communication between example control system 110 and one or more additional devices. For example, communication interface 122 may facilitate communication between control system 110 and a private or public network including additional control systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between control system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow control system 110 to engage in distributed or remote computing. For example, communication interface 122 may receive instructions from a remote device or send instructions to a remote device for execution.

As illustrated in FIG. 1, control system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 1, control system 110 may also include at least one input device 128 coupled to communication infrastructure 112 via an input interface 130. Input device 128 generally represents any type or form of input device capable of providing input, either computer- or human-generated, to control system 110. Examples of input device 128 include, without limitation, a keyboard, a pointing device, a speech recognition device, or any other input device.

As illustrated in FIG. 1, control system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of control system 110.

In one example, databases 140 may be stored in primary storage device 132. Databases 140 may represent portions of a single database or computing device or it may represent multiple databases or computing devices. For example, databases 140 may represent (be stored on) a portion of control system 110 and/or portions of example network architecture 200 in FIG. 2 (below). Alternatively, databases 140 may represent (be stored on) one or more physically separate devices capable of being accessed by a computing device, such as control system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into control system 110. For example, storage devices 132 and 133 may be configured to read and write software, data, or other computer-readable information. Storage devices 132 and 133 may also be a part of control system 110 or may be separate devices accessed through other interface systems.

Many other devices or subsystems may be connected to control system 110. Conversely, all of the components and devices illustrated in FIG. 1 need not be present to practice the embodiments described herein. The devices and subsystems referenced above may also be interconnected in different ways from that shown in FIG. 1. Control system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into control system 110. All or a portion of the computer program stored on the computer-readable medium may then be stored in system memory 116 and/or various portions of storage devices 132 and 133. When executed by processor 114, a computer program loaded into control system 110 may cause processor 114 to perform and/or be a means for performing the functions of the example embodiments described and/or illustrated herein. Additionally or alternatively, the example embodiments described and/or illustrated herein may be implemented in firmware and/or hardware.

Decentralized Storage Environment

Figure 2:
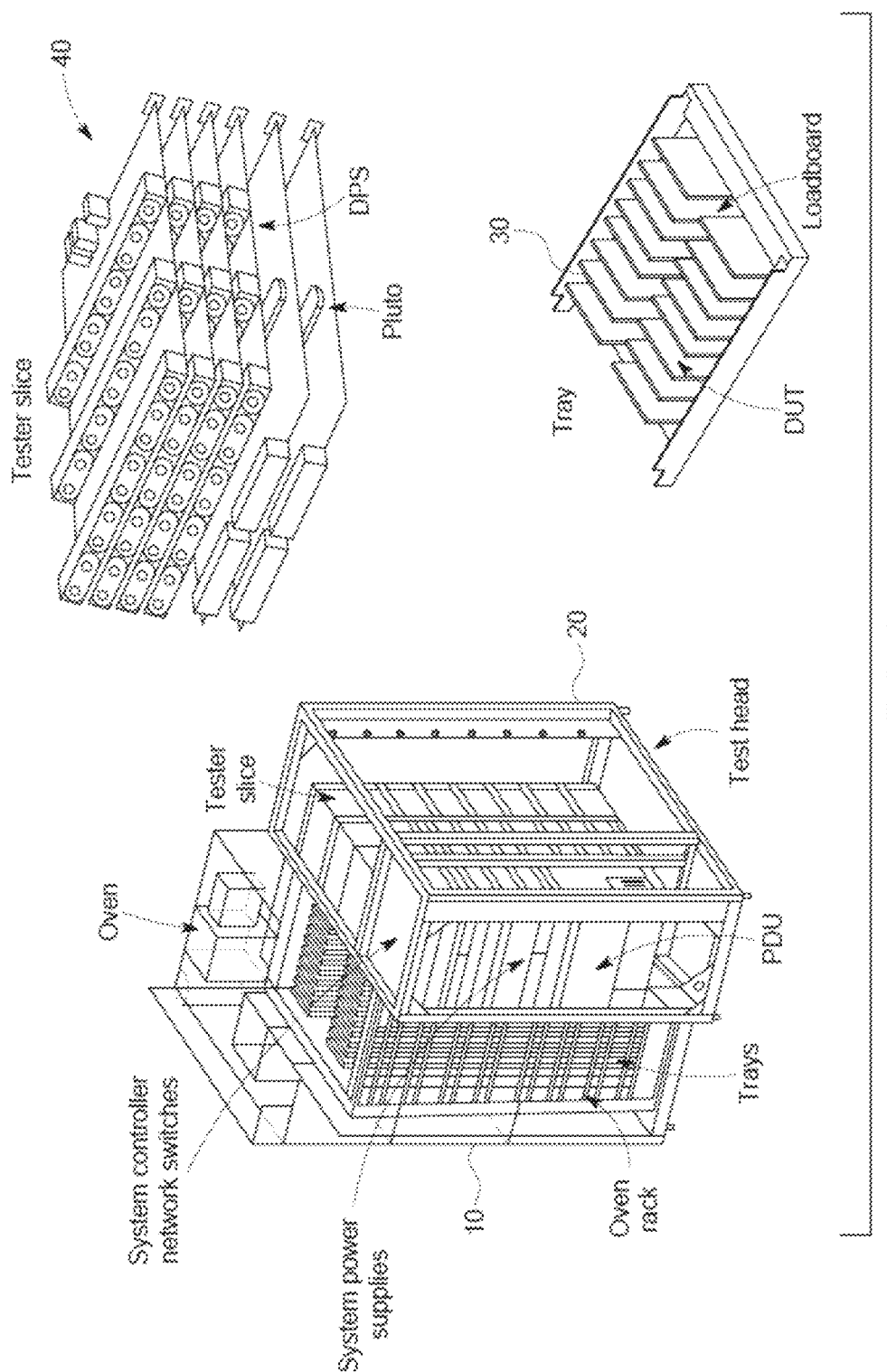
FIG. 2 illustrates a typical testing environment in which DUTs are placed into a controlled environmental chamber.

FIG. 2 illustrates a typical testing environment in which devices under test (DUTs) are placed into a controlled environmental chamber 10 or "oven." The DUTs, e.g., SSDs are connected to tester slices of a test head 20. Many DUTs can be connected to a single tester slice 40. The tester slices contain the test circuitry, which performs tests on the DUTs in accordance with a test plan. There can be many tester slices per test head 20. The DUTs are placed into trays 30 when inserted into the oven 10. When in the oven 10, the DUTs are typically not user accessible so as to not disturb the controlled environment of the chamber 10. Further, the test head is typically controlled by a single system controller (not shown) that is directly connected to the test head and, in this fashion, controls all of the slices of the test head 20. A single user executing a test plan on the DUTs typically operates the controller computer.

A problem of this testing environment, as noted above, is that if a set or array of SSD storage devices are being tested in the ATE system, each storage device is communicated with using a separate communication channel from the system controller to the device. This creates a large amount of traffic that needs to go through the primary communication channel coupled to the system controller. This can create a bottleneck at the primary communication junction at the system controller. Also, if the system controller is required to send the same command to each individual device in the set (to re-purpose the set, establish encryption, reset the devices, etc.) then the communication mechanism becomes inefficient as commands and data are duplicated and passed from the system controller to each device.

Figure 3:
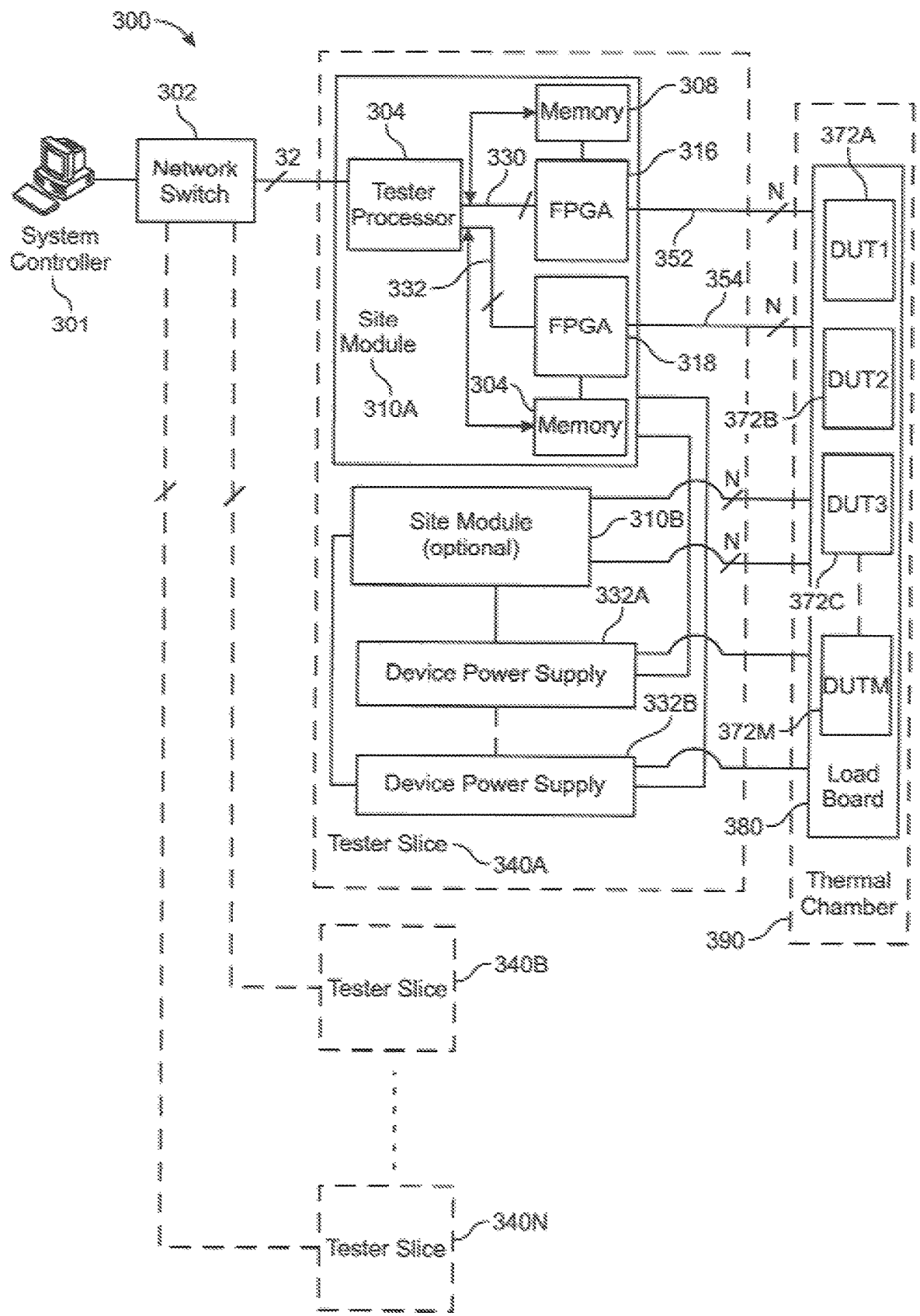
FIG. 3 is a detailed schematic block diagram illustrating an exemplary embodiment of a tester slice and its interconnections with the system controller and the DUTs.

FIG. 3 is a detailed schematic block diagram illustrating an exemplary embodiment of a tester slice and its interconnections with the system controller and the DUTs.

Referring to FIG. 3, each tester slice comprises site modules. The site modules, in one embodiment, can be mechanically configured onto tester slices 340A-340N, wherein each tester slice comprises at least one site module. In certain typical embodiments, each tester slice can comprise two site modules and two device power supply boards. In other embodiments, the tester slice may comprise more or fewer site modules and/or power supply boards. Tester slice 340A of FIG. 3, for example, comprises site modules 310A and 310B and device power supply boards 332A and 332B. However, there is no limit to the number of device power supply boards or site modules that can be configured onto a tester slice. Tester slice 340 is connected to system controller 301 through network switch 302. Network switch 302 can be connected to each of the site modules with a 32 bit wide bus.

In one embodiment, the system controller 301 may be a computer system, e.g., a personal computer (PC) that provides a user interface for the user of the ATE to load the test programs and run tests for the DUTs connected to the ATE

300. The Advantest Stylus™ Operating System is one example of test software normally used during device testing. It provides the user with a graphical user interface from which to configure and control the tests. It can also comprise functionality to control the test flow, control the status of the test program, determine which test program is running, and log test results and other data related to test flow. In one embodiment, the system controller can be connected to and control as many as 512 DUTs.

In one embodiment, the system controller 301 can be connected to the site module boards 310A-310B through a network switch, such as an Ethernet switch. In other embodiments, the network switch may be compatible with a different protocol such as Fibre Channel, 802.11 or ATM, for instance.

Each of the device power supply boards 332A-332B can be controlled from one of the site modules 310A-310B. The software running on the tester processor 304 can be configured to assign a device power supply to a particular site module. In one embodiment, the site modules 310A-310B and the device power supplies 332A-332B are configured to communicate with each other using a high speed serial protocol, e.g., Peripheral Component Interconnect Express (PCIe), Serial AT Attachment (SATA) or Serial Attached SCSI (SAS), for instance.

In one embodiment, each site module is configured with two FPGAs as shown in FIG. 3. Each of the FPGAs 316 and 318 in the embodiment of FIG. 3 is controlled by the tester processor 304. The tester processor 304 can communicate with each of the FPGAs using a 8 lane high speed serial protocol interface such as PCIe as indicated by system buses 330 and 332 in FIG. 3. In other embodiments, the tester processor 304 could also communicate with the FPGAs using different high speed serial protocols, e.g., Serial AT Attachment (SATA) or Serial Attached SCSI (SAS).

FPGAs 316 and 318 are connected to memory modules 308 and 304 respectively. The memory modules can be coupled with and can be controlled by both the FPGA devices and the tester processor 304.

FPGAs 316 and 318 can be connected to the DUTs 372A-372M on the load board 380 through buses 352 and 354 respectively. The load board 380 is a physical harness that allows a general purpose high speed connection at the site module end that is agnostic to the protocol used to communicate to the DUTs in on lines 352 and 354. At the DUT end, however, the load board needs to be designed so as to have connectors specific to the protocol being used by the DUT.

It should be noted that FIG. 3 only illustrates an exemplary embodiment of a tester slice. Further, note that embodiments of the present invention are not limited to only the type of tester slices shown in FIG. 3. Embodiments of the present invention can include may different types of tester slices and primitives as will be discussed further below.

The DUTs 372A-372M, in one embodiment of the invention, are loaded on a load board 380 that is placed inside a thermal chamber 390 for testing. The DUTs 372A-372M and the load board 380 derive power from the device power supplies 332A and 332B.

The number of DUTs that can be connected to each FPGA is contingent on the number of transceivers in the FPGA and the number of I/O lanes required by each DUT. In one embodiment, FPGAs 316 and 318 can each comprise 32 high speed transceivers and buses 352 and 354 can each be 32 bits wide, however, more or less can be implemented depending on the application. If each DUT requires 8 I/O lanes, for example, only 4 DUTs can be connected to each FPGA in such a system.

Figure 4A:
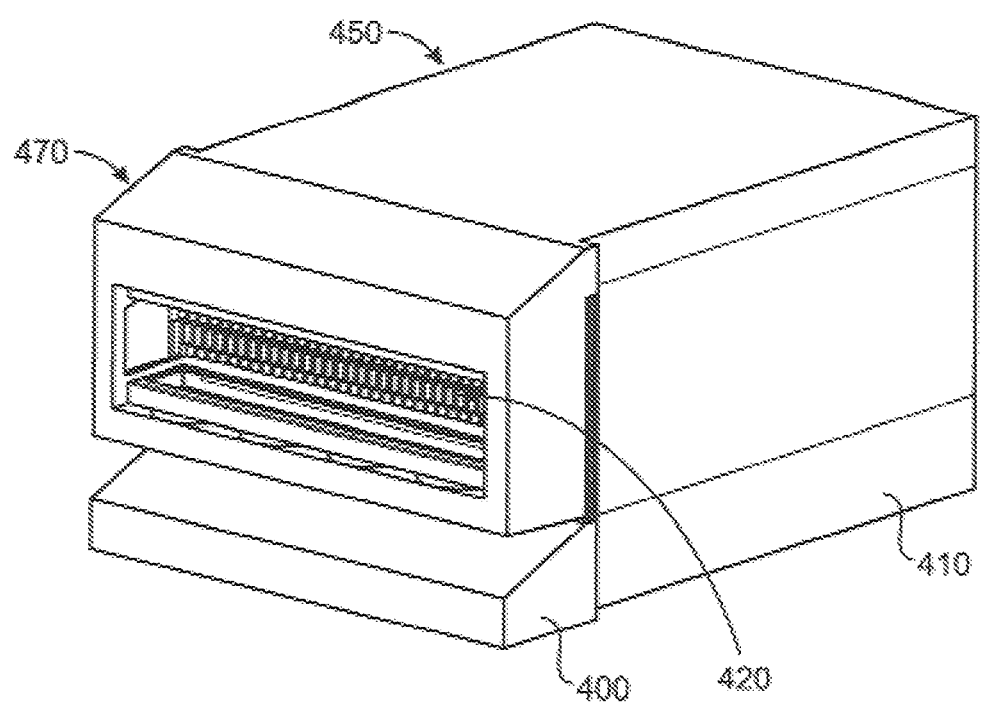
FIG. 4A illustrates a primitive interfaced with a DUT Interface Board (DIB) 400 in accordance with an embodiment of the invention.

FIG. 4A illustrates a primitive 410 interfaced with a DUT Interface Board (DIB) 400 in accordance with an embodiment of the invention. Similar to the tester slice 40 shown in FIG. 2, the primitive of FIG. 4 is a type of discrete test module that fits into test head 20 and comprises the test circuitry, which performs tests on the DUTs in accordance with a test plan. A primitive comprises an enclosure 450 within which all the various electronics e.g., site modules, power supplies, etc. are housed. The DIB 400 can contain a plurality of DUTs 420 using custom connectors sized for the DUTs 420. The DIB 400 can also comprise an enclosure 470. The DIB 400 interfaces to a universal backplane (not shown) of the primitive 410 through a load board (not shown) similar to load board 380 shown in FIG. 3. The primitive 410 contains test circuitry (similar to tester slice 340A shown in FIG. 3) for performing a test plan on the DUTs 420. The primitive 410 can operate independently of any other primitive and is connected to a control server (similar to system controller 301 shown in FIG. 3).

Figure 4B:
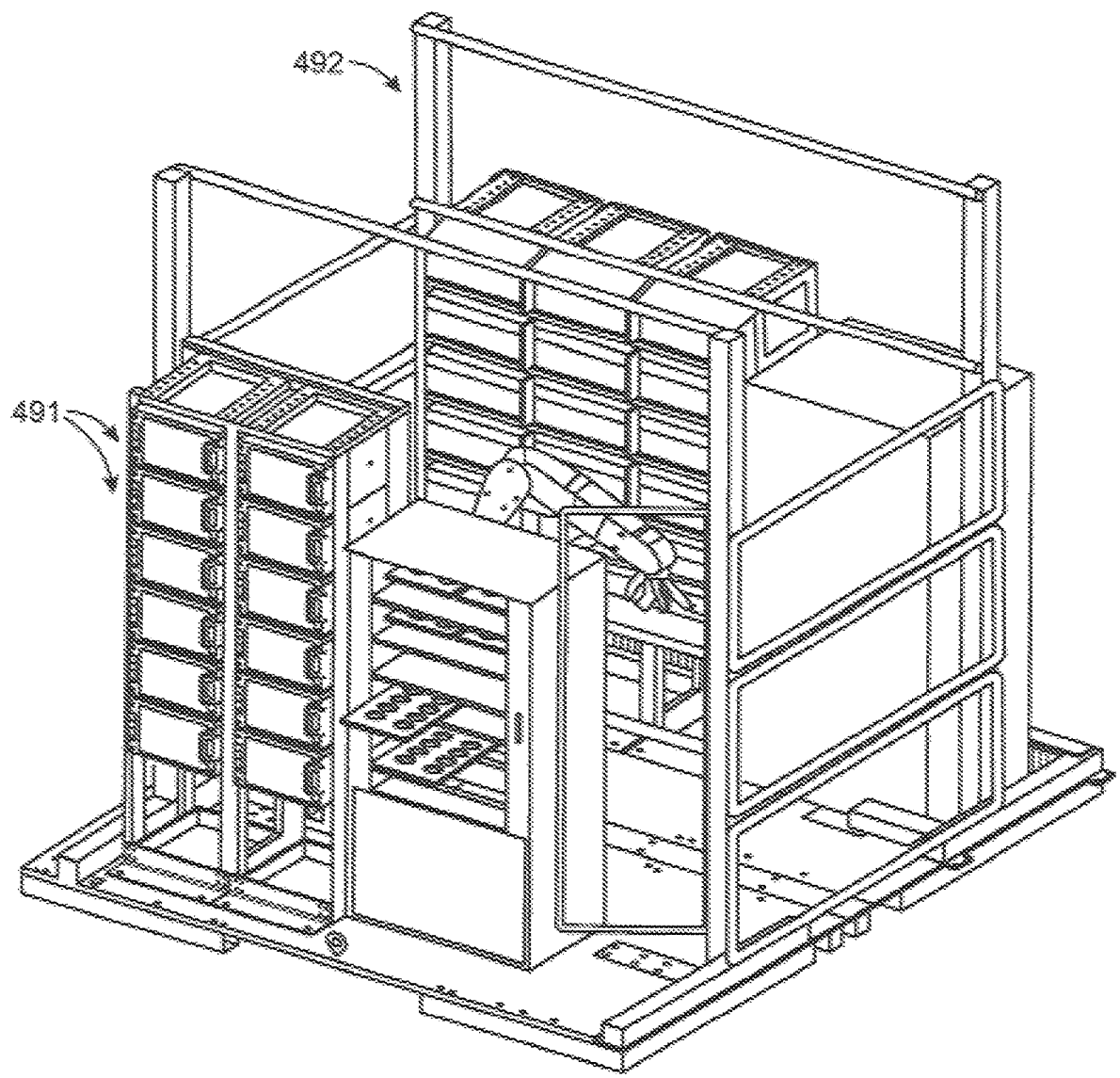
FIG. 4B illustrates a work-cell comprising a plurality of primitives.

FIG. 4B illustrates a work-cell comprising a plurality of primitives 491 within a single tester rack 492. Embodiments of the present invention utilize a plurality of primitives (similar to the primitive shown in FIG. 4B) and associated DIBs to test the DUTs. Embodiments of the present invention can also use tester slices (similar to tester slice 40 in FIG. 2) to test the DUTs. Each primitive (or tester slice) is modular meaning that it is capable of operating independently from other primitives (or tester slices). The primitives communicate with a control server for instructions, control, management, etc. The control server is capable of hosting multiple application programs or test plans for the various primitives it supports. The primitive can communicate with the server via a standard IP network. Various computer systems, which can be located remotely, can access the server via standard IP network connections.

Each primitive may be connected to and testing several SSDs simultaneously. Further, each of the primitives is controlled by a control server. As noted above, a challenge associated with this testing environment is that in conventional systems each SSD connected to a primitive within the ATE framework communicates with the control server using a separate communication channel thereby creating bottlenecks at the system controller. Further, it results in the system controller transmitting duplicative commands to all the devices connected to the primitives.

Figure 5:
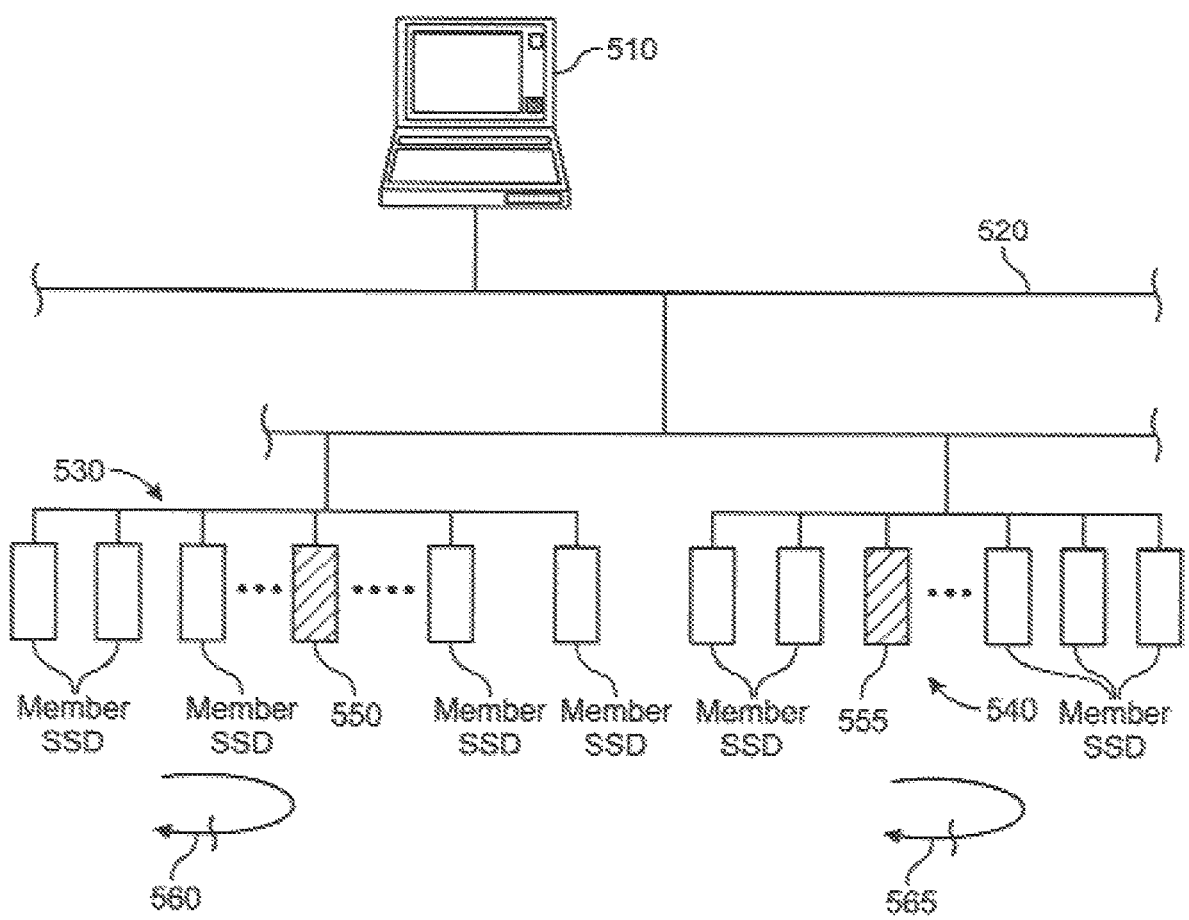
FIG. 5 illustrates an exemplary distributed network topology with two super cells in accordance with an embodiment of the present invention.

In one embodiment of the present invention, the system controller (controller 301 in FIG. 3 for example) can be connected to nucleus devices within a primitive (e.g., primitives arranged in a rack as shown in FIG. 4B), wherein the system controller sends control and configuration information to the nucleus devices within the primitives and the nucleus devices communicate with other member devices (e.g., SSD DUTs) within the primitive. For example, as seen in FIG. 5, super cell 530 and associated nucleus device 550 may be part of a single primitive in a testing rack while super cell 540 and associated nucleus device 555 may be part of a different primitive within the same testing rack. The system controller 501 (similar to system controller 301) communicates with the various primitives (and associated super cells) as will be further explained below.

As also discussed above, challenges similar to the ones encountered in the ATE framework (discussed in connection with FIGS. 2, 3, 4A and 4B) also occur in cloud computing systems in general. For example, in conventional cloud computing environments, a control server will typically need to be able to communicate with each of the devices in the cloud based system in order to configure and control the devices. This results in decreased data bandwidth due to the overhead. In the embodiment pertaining to cloud computing systems, super cells 530 and 540 may comprise storage devices that are part of a server farm storing email or other data.

FIG. 5 illustrates an exemplary distributed network topology with two super cells in accordance with an embodiment of the present invention. In order to address the drawbacks of conventional ATE or cloud computing systems, embodiments of the present invention provide a network topology that is organized into one or more "super cells," with each super cell comprising multiple SSD devices. The system controller 510 configures the one or more super cells (super-cells 530 and 540 in FIG. 5). The super cell may be of any arbitrary size—in other words, each super cell may comprise any number of SSD devices. Furthermore, each super-cell in a single network may be of a different size than the other super-cells. The devices in a super cell may, in one embodiment, be configured to act as single storage unit.

It should be noted that the embodiment illustrated in FIG. 5 is applicable to both the ATE framework environment and the cloud computing environment. As mentioned above, super cell 530 and associated nucleus device 550 may be part of a single primitive in a testing rack while super cell 540 and associated nucleus device 555 may be part of a different primitive within the same testing rack. Alternatively, super cells 530 and 540 may comprise storage devices that are part of a server farm in a cloud computing system storing email or other data.

As shown in FIG. 5, a system controller 510 is connected to a backbone, e.g., a PCIe backbone. It should be noted that the backbone can utilize one of several different communication protocols and is not limited to PCIe. Also coupled to the backbone 520 are two super cells of SSD devices, 530 and 540. Each set comprises a plurality of SSD devices, which are all connected to the PCIe backbone 520. The SSD devices may also have wireless communication functionality between themselves if they are co-located. It should be noted that the wireless range of the member devices may, in certain instances, limit the size of a super-cell. For example, if the devices in a super-cell are configured to communicate wirelessly with each other, the size of the super-cell is constrained so that each of the devices within the super-cell can wirelessly communicate with each other without any signal attenuation. In other words, all the member devices of a super-cell need to be able to communicate with each other without signal loss.

In a different embodiment, the devices of a super-cell are configured to only talk to the nucleus and do need to communicate between themselves. In this embodiment, a super-cell needs to be sized so that all devices can communicate with the nucleus device without any signal degradation.

From each super cell, in an ATE framework or in a cloud computing system, the distributed system will be configured to elect one of the devices (e.g., SSD devices) in the super cell to be a nucleus or a sub-controller device. In other words, the ATE framework or cloud computing system comprises a number of subsets of devices (or super cells), wherein a device in the super cell that is designated as the nucleus controls each subset or super cell.

In one embodiment, during the initial configuration, each subset or super-cell may enter into a nucleus election process (shown as elements 560 and 565 in FIG. 5) where a sequence of commands and information are passed round the super-cell. The devices select a nucleus amongst themselves based on certain criteria that the devices may be programmed with, e.g., selecting a device with the highest processing power or the most resources. During the nucleus election process, the devices in a super-cell may wirelessly communicate with each other. This communication may also be done over the backbone 520. The result of the nucleus selection process is that each super cell elects a nucleus, shown as devices 550 and device 555.

In the embodiment where the nucleus is established through a nucleus election process between the various members of a super-cell, the identity of the nucleus is communicated to the system controller 510 subsequent to the election.

In a different embodiment, for example, the system controller can organize the various SSD devices in the network into super-cells and further elect a device in each designated super cell as the nucleus. For example, the system controller may designate a super-cell to which each of the devices in the distributed topology belongs and further determine a nucleus for each of the super-cells. By way of example, a system controller may designate that each super-cell may only have 14 members and further designate one of those 14 devices in each super-cell to act as a nucleus to manage the activities of the member devices.

In one embodiment, a system controller may simply designate certain devices (e.g., devices with the most resources) in the network as nucleus devices. Each nucleus may then be programmed with the autonomy to communicate with nearby SSDs and set up a communication protocol to establish membership to the super-cell. For example, the nucleus may poll nearby devices and incorporate devices that are not already part of a different super-cell into its membership base. Once the super-cell has been established, the nucleus then communicates back with the system controller 510 to report the collection of all SSDs that make up the super-cell.

The nucleus controls the super cell and communicates to the system controller 510 and vice-versa. The criteria used for the nucleus selection can, in one embodiment, be arbitrary. For example, the criteria may include selecting devices that have the most resources as nucleus devices. Alternatively, other criteria may be used, e.g., selecting devices with the faster processor or the best "health" record. Ultimately, any number of different criteria can be used to determine which device in a super-cell is designated as the nucleus.

At this point, once the super cell and the nucleus are established, the system controller 510 can communicate batch commands or data or state information to the nucleus for controlling any or all of the devices of the super cell. In other words, once the super cell and the nucleus are established, communication or commands to any of the devices in the super cell are first directed to a nucleus device from the system controller. The nucleus then communicates with the individual device. The same is also true for any upstream communication. For example, in an ATE framework, a nucleus device may receive information regarding the test program from the system controller 510 and would subsequently be responsible for scheduling tests on each of the member devices. In other words, the nucleus, in one embodiment, may be programmed to receive the test program information from the system controller and run specific tests on all the member devices of the super-cell. This decreases the cost per device under test (DUT) of executing tests because the controller does not have to manage the tests on all connected device at the same time.

It should be noted, that typically no members of a super-cell (e.g., 530 and 540) will communicate directly with the system controller 510 except the nucleus. In one embodiment, the nucleus can communicate with all the devices in the super-cell wirelessly.

In effect, after the super cell is established, the system controller 510 can treat the super cell as though it was a single large storage device, allowing the nucleus to be the intermediary that translates high-level commands from the system controller 510 to low level, individual commands and data to each SSD device in the array. The same is also true for gathering state information from the devices of the super-cell. In effect, the devices of the super-cell can communicate state information to the nucleus, which can aggregate this information and send it to the system controller 510. In one embodiment, these functions may be implemented by establishing a command syntax between the system controller 510 and the nucleus, e.g., 550 or 555.

In one embodiment, the nucleus is able to directly control and communicate with other devices in the super cell. This advantageously frees up the system controller from needing to control each device independently. As noted above, the system controller, in one embodiment of the present invention, may direct instructions or data to the nucleus, which then is able to directly communicate commands, status, data or configuration information to or from the other devices of the super cell (in accordance with the instructions received from the system controller) without any of this information originating from the system controller. In other words, configuration commands over the storage backbone would only occur between the server and the nucleus devices. This frees up the backbone 520 to communicate data instead of command and configuration information.

In one embodiment, the configuration commands that are exchanged between the system controller 510 and the nucleus devices 550 and 555 are migrated to a wireless network, so that the wired backbone is freed up to only communicate storage data. This allows complete separation of the configuration/housekeeping commands (exchanged between the controller and the nucleus devices) from the storage backplane communications. One of the ways in which commands can be communicated from the system controller 510 to all the nucleus devices in the network is through node hopping as will be further discussed in connection with FIG. 7.

By directing certain communications to the nucleus (from the system controller 510), rather than to each individual SSDs of the super-cell, PCIE traffic is advantageously reduced at the bottleneck points near the system controller on the PCIE backbone 520. The same is true with respect to certain communications from the nucleus to the system controller 510 that would otherwise require separate communications from individual SSDs to the controller 510. Since the SSD devices of a super-cell may also communicate wirelessly with each other, this further reduces traffic on the backbone 520.

Offloading certain set-up and housekeeping commands away from the data path allows embodiments of the present invention to advantageously increase the overall network data transfer bandwidth. This is a significant improvement over conventional ATE systems and cloud computing networks because it alleviates any bottlenecks at the system controller and also any need for the system controller to duplicate commands directly to each hard drive of the super cell.

Additionally, because the nucleus will typically only control a subset of devices in the system and will be in close proximity to those devices, information regarding a failure or maintenance for any of those devices can be easily retrieved.

Several other advantageous functionalities are provided by the distributed topology of FIG. 5. Once the nucleus is established, it can be effective in load balancing data storage across the subset or super-cell of SSDs by directing data to specific devices based on load balancing characteristics and history information as known by the nucleus. This can be done transparently with respect to the controller 510. Because the nucleus is managing a much smaller sub-set of SSDs than the system controller, it has the bandwidth to perform such load balancing.

Furthermore, configuration information can be communicated to the nucleus from the controller 510 and the nucleus can be responsible for individually configuring the devices of the super cell (e.g., to re-purpose the super cell, etc.). In one embodiment, the nucleus may be configured to perform a specific task by the system controller—the nucleus can then configure and re-purpose the hard drives in its super-cell to perform the specific task. In other words, once the nucleus is configured to perform a certain function, it can broadcast or distribute that functionality to other member devices in the super cell. Accordingly, the nucleus can be responsible for re-purposing the super-cell based on commands from the controller 510.

The nucleus can also be responsible for establishing redundant storage across the super cell. Additionally, the nucleus can also be responsible for collecting state and health/diagnostic information from each SSD device of the super cell and communicating that information back to the controller 510 and/or taking action to drop or reduce an SDD that may indicate poor or failing health. In this way the topology of FIG. 5 is much better suited to respond to SSDs that are failing or undergoing maintenance as compared to conventional systems, thereby, providing a significant improvement to computer related technology.

In one embodiment, the nucleus can also be responsible for establishing encryption across the super-cell in accordance with received commands from the controller 510.

Figure 6:
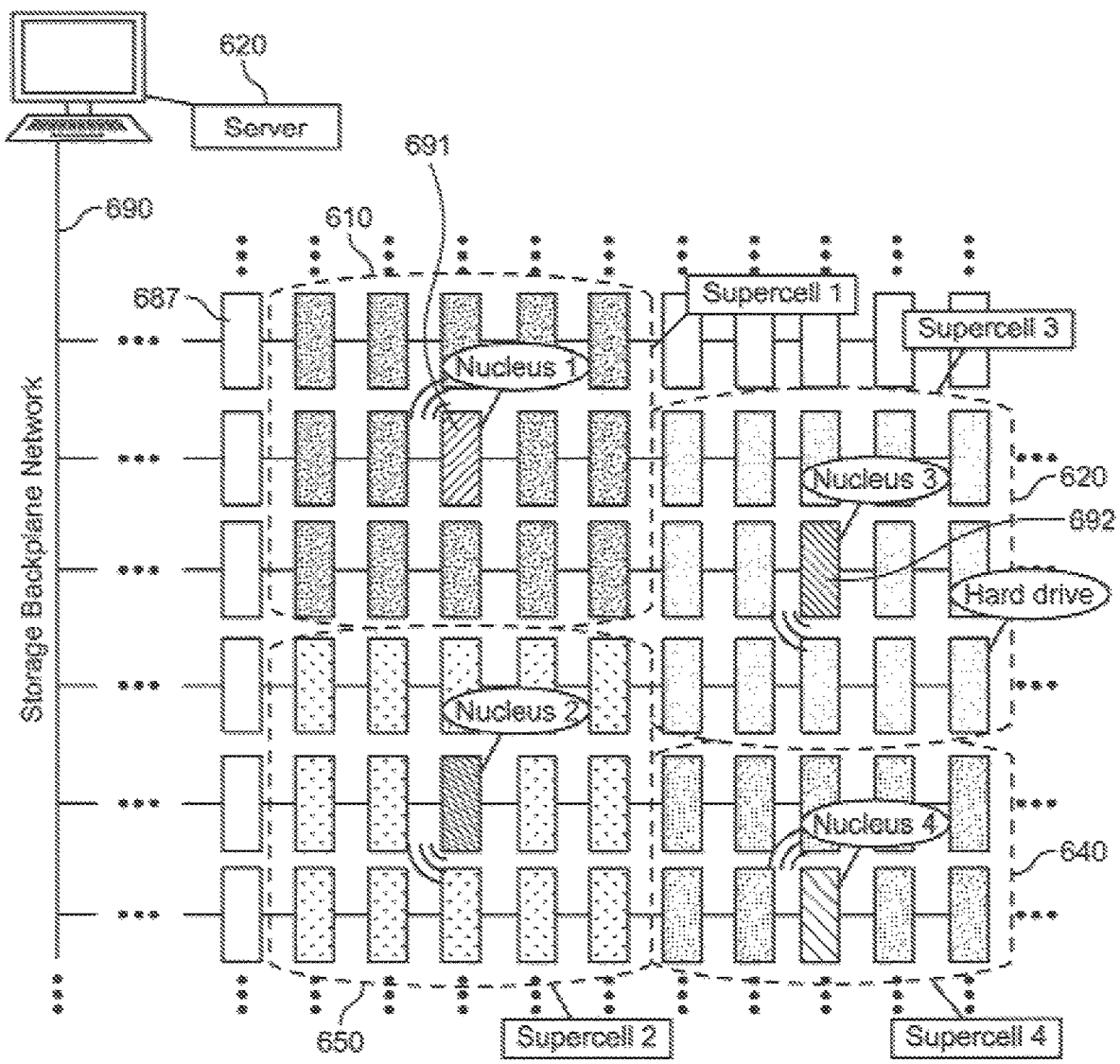
FIG. 6 illustrates another exemplary distributed network topology with four super cells in accordance with an embodiment of the present invention.

FIG. 6 illustrates another exemplary distributed network topology with four super cells in accordance with an embodiment of the present invention. As shown in FIG. 6, the system controller 620 communicates with the super-cells over a storage backplane network 690. FIG. 6 illustrates four different super cells, 610, 620, 640 and 650, within the distributed network (which may be an ATE framework comprising multiple primitives or a cloud computing network). As shown in FIG. 6, not all super-cells are required to be the same size. For example, super-cell 640 has fewer member devices than the other super-cells.

In one embodiment, the nucleus devices may be programmed to add member drives if necessary. For example, if the nucleus device 691 of super-cell 610 is programmed to perform a specific task and over time it requires more storage drives in its super-cell to perform the task, the nucleus device may be programmed to add a drive, e.g., drive 687 that is not already part of a super-cell. Alternatively, the nucleus device 691 may be programmed to communicate with the nucleus device 692 in order to borrow a drive from super-cell 620.

Similarly, if a member device of a super-cell fails or is undergoing maintenance, the nucleus device is much better positioned than the system controller 620 to respond to problematic devices. If the nucleus determines that a member device is failing or undergoing maintenance and if the super-cell requires extra storage to compensate for the dysfunctional device, the nucleus is able to borrow a device from neighboring super-cells or incorporate devices that do not belong to any super-cell, e.g., device 687.

Furthermore, in one embodiment, if an entire super-cell needs to be serviced, a nearby super-cell and its associated nucleus device can be re-purposed to perform the functions of the super-cell being serviced. For example, if super-cell 610 stores certain critical data, the nucleus device 692 of super-cell 620 can be temporarily programmed to control its member devices to perform the functions of super-cell 610 while super-cell is being serviced.

In one embodiment, if the nucleus device of a particular super-cell is failing, the nucleus device of a neighboring super-cell may be able to adopt the members of the failing nucleus device. For example, if nucleus device 691 fails or is undergoing maintenance, nucleus device 692 may be configured to adopt all the member devices of super-cell 610.

Furthermore, in one embodiment, if another member device in super-cell 610 has the same computational abilities as nucleus device 691, embodiments of the present invention may also be programmed with the flexibility to promote the member device to serve the role of the nucleus. In other words, assuming that a member device has the minimum required computational power, it can be promoted to the role of a nucleus device if the nucleus device fails or is undergoing maintenance.

Accordingly, embodiments of the present invention provide increased reliability through flexibility and redundancy. Member devices, for example, may be swapped out for other devices when failing or undergoing maintenance. By way of further example, a nucleus device can be easily reconfigured to change the function of the super-cell. Moreover, a super-cell has the flexibility to change its hard drive membership. Reconfiguration of a nucleus device can re-assign hard drive members of neighboring super cells if expanded resources are needed. Further, if super cells have failed or are off-line for maintenance, neighboring super-cells can be reconfigured temporarily to bridge services. The increased flexibility provided by embodiments of the present invention allows for increased adaptability for reliability in real time.

Figure 7:
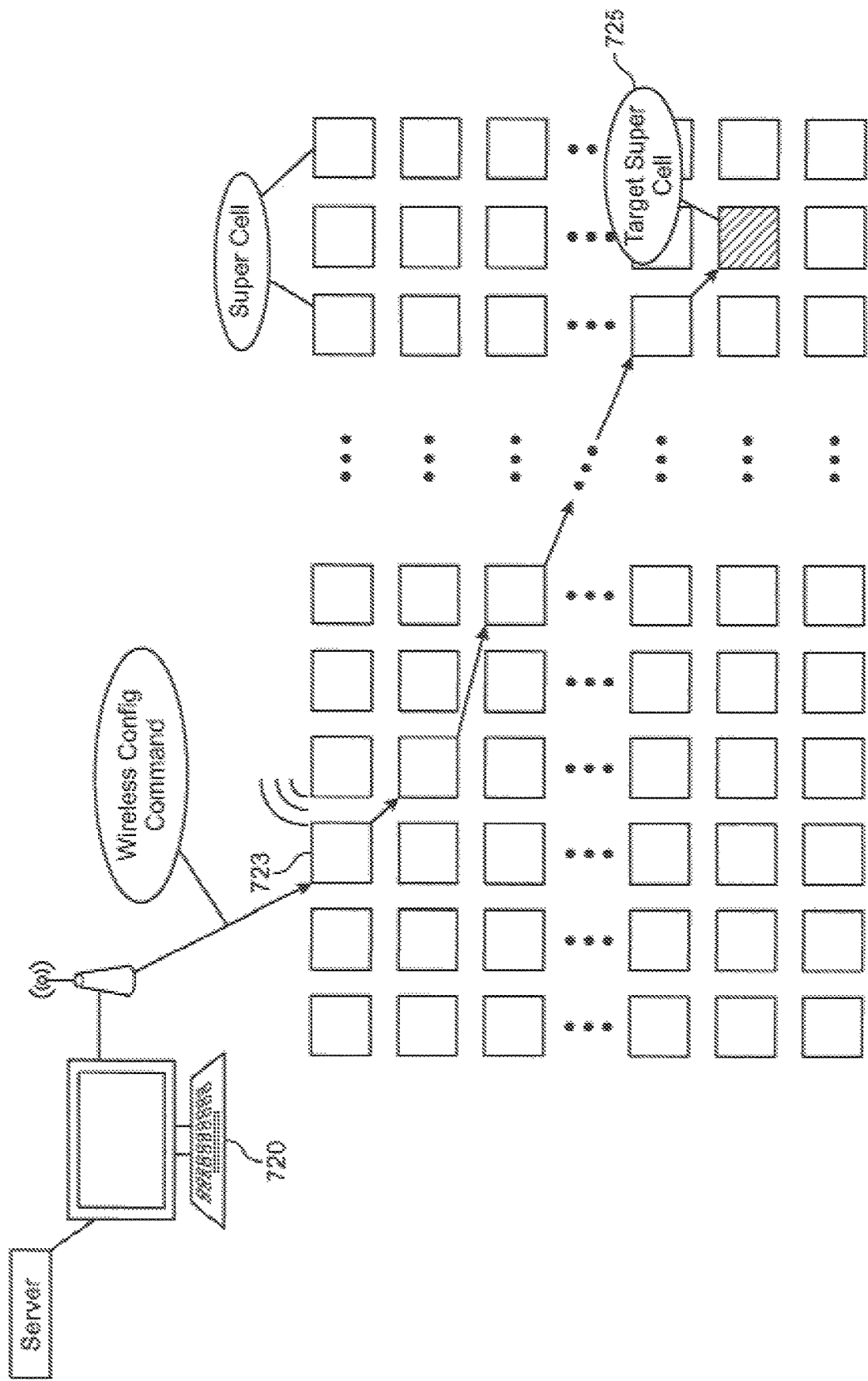
FIG. 7 illustrates an exemplary distributed network topology where the configuration commands are communicated wirelessly from the system controller to the nucleus devices in the super cells in accordance with an embodiment of the present invention.

FIG. 7 illustrates an exemplary distributed network topology where the configuration commands are communicated wirelessly from the system controller to the nucleus devices in the super cells in accordance with an embodiment of the present invention. In the embodiment shown in FIG. 7, configuration commands are communicated from the system controller 720 to a target super-cell 725 by sending the commands to/from adjacent super-cell to super-cell through node-hopping. As shown in FIG. 7, the commands are first received by super-cell 723. The nucleus device of super-cell 723 is configured to analyze the commands received from the controller 720 and determine that the commands are meant for a different super-cell. The nucleus device of super-cell 723 can then transmit the commands wirelessly to a super-cell that is adjacent to it in the direction of the target super-cell 725. After a series of similar node hops, the commands finally reach the target super-cell 725. In this way target super-cell configuration commands are distributed to the member hard drive community of the target super-cell through wireless communications.

It should be noted that the super-cells shown in FIG. 7 can either comprise SSDs being tested in an ATE framework or they can comprise storage devices in a cloud computing system, e.g., a server farm.

Figure 8:
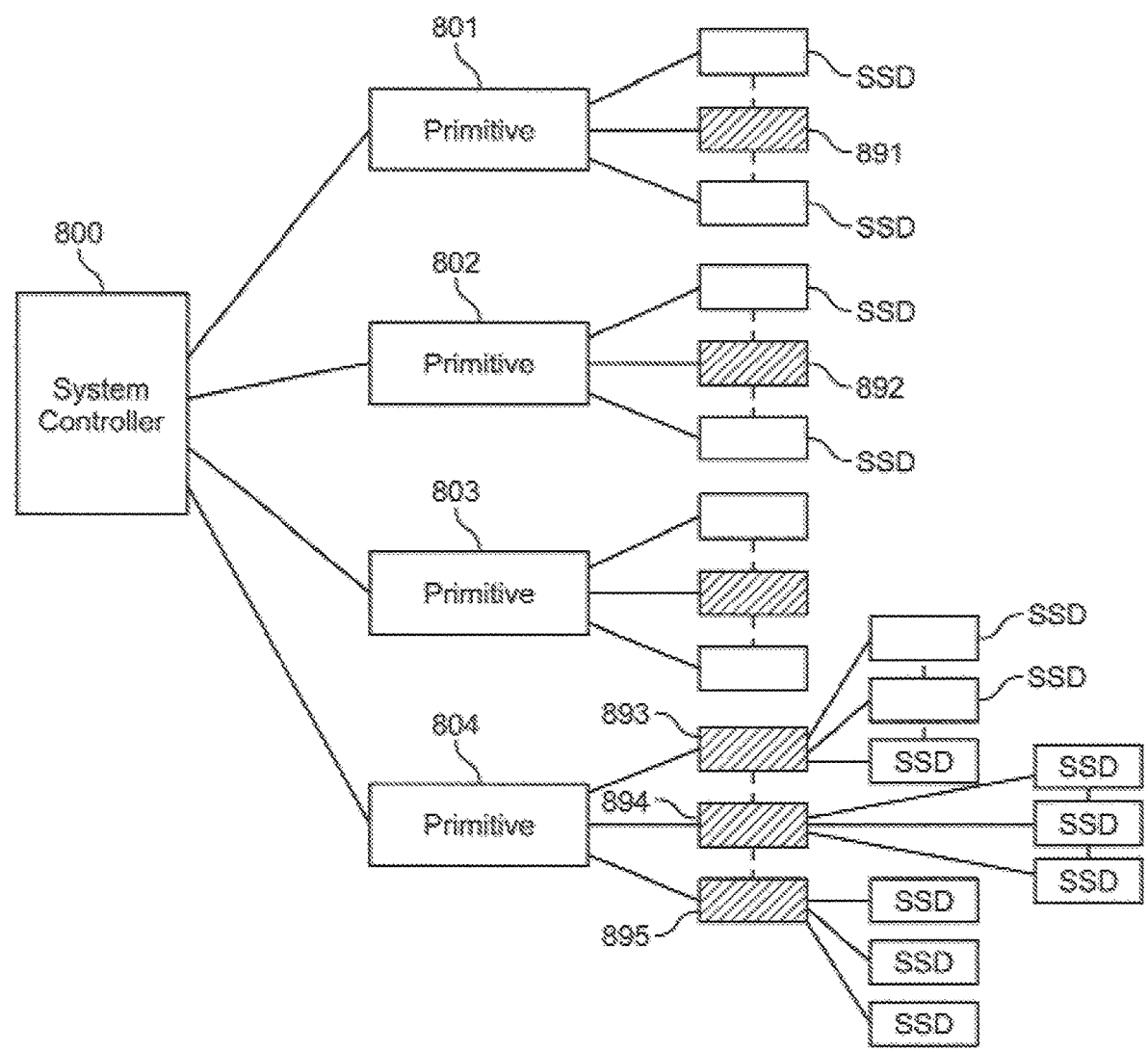
FIG. 8 illustrates a configuration for executing tests in an ATE framework using super-cells in accordance with an embodiment of the present invention.

FIG. 8 illustrates a configuration for executing tests in an ATE framework using super-cells in accordance with an embodiment of the present invention.

As noted above, in an ATE framework, a nucleus device may receive information regarding the test program from the system controller 800 and would subsequently be responsible for scheduling tests on each of the member devices. In other words, the nucleus, in one embodiment, may be programmed to receive the test program information from the system controller and run specific tests on all the member devices of the super-cell.

As shown in FIG. 8, the system controller 800 may connect and communicate with a plurality of primitives, e.g., primitives 801, 802, 803 and 804. In one embodiment, each of the primitives shown in FIG. 8 may be arranged in a single rack as shown in FIG. 4B.

In one embodiment, one of the devices connected to the primitive may be elected as the nucleus, e.g., nucleus 891 or 892. The nucleus, which may be one of the devices being tested within the primitive will then control the activities of all the other member devices within the primitive. In another embodiment, the primitive may comprise multiple nucleus devices (e.g., devices 893, 894 and 895), each of which is connected to its own set of member devices, as shown in FIG. 8. In this way, the number of SSDs being tested and managed by each individual primitive is increased.

Electing one or more nucleus devices in a primitive to manage the testing of the other SSDs connected to the primitive reduces the computational processing load on the system controller 800 and each of the tester slices within the primitive to which the SSDs are connected.

In one embodiment, the nucleus device (e.g., device 891, 893, etc.) is not a device under test but may be a specially configured controller device that is programmed to manage the testing of all connected SSD devices.

The nucleus device can be configured, for example, to initiate execution of tests on connected DUTs and collect the results to report back to the system controller 800. For example, the nucleus device may be programmed with the intelligence to run specific tests on specific member devices or run specific test patterns on specific devices. Furthermore, the member devices can be configured to communicate their results wirelessly to the nucleus device which obviates the need for multiple physical connections to the primitive and reduces network traffic.

In one embodiment, wireless functionality of member devices within any nucleus may be enabled with an extender card or daughter card that fits into an external port of a member device, e.g., SSD that may provide wireless functionality. The extender card can also be connected to the wired backbone to allow the SSD both wired and wireless communication functionality. The wired connection to the backbone may be used primarily for carrying storage data while the wireless connection can be used for control and configuration commands as discussed above.

Figure 9:
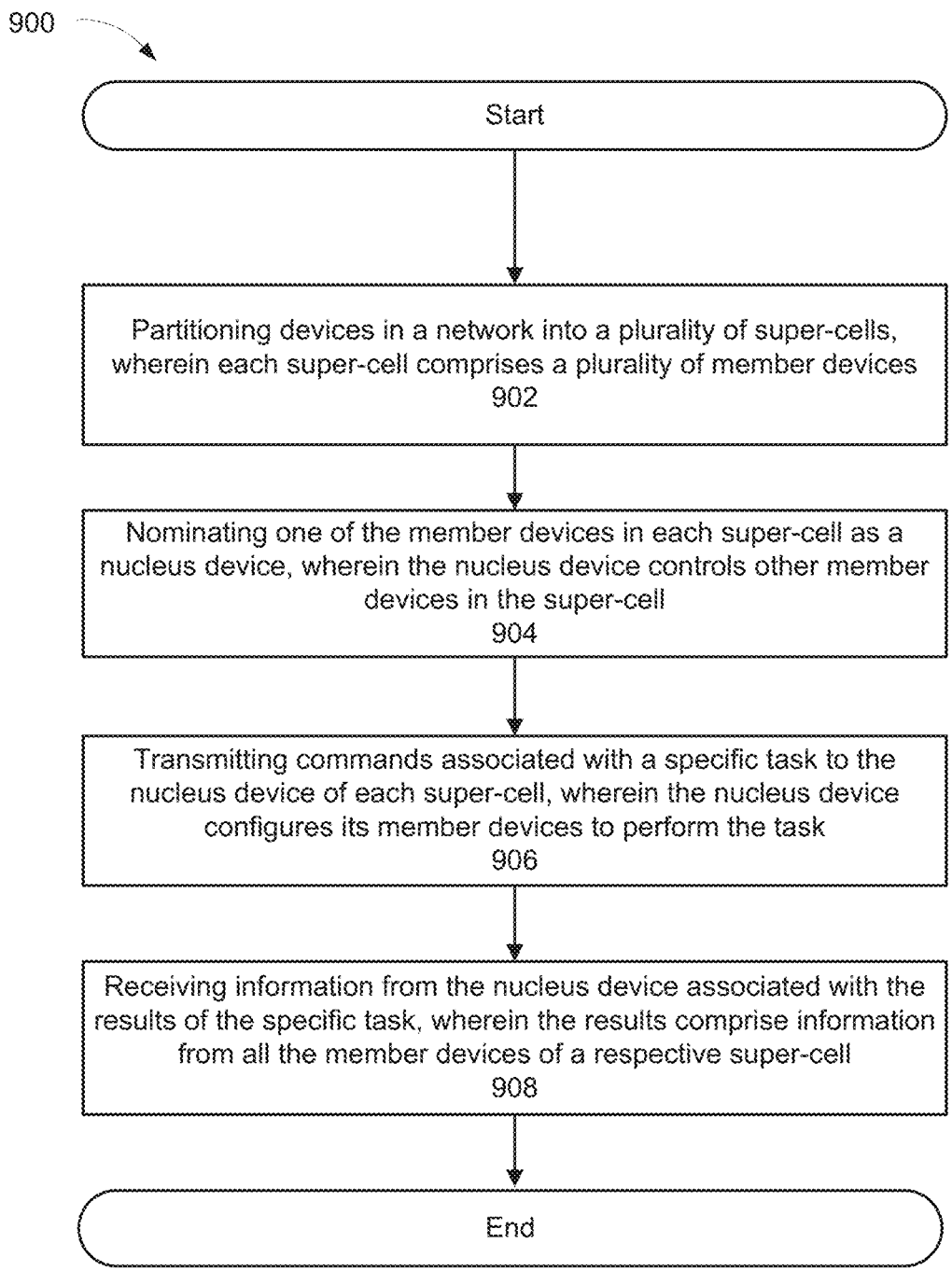
FIG. 9 illustrates a flowchart of an exemplary computer implemented process for controlling devices in a distributed storage environment in accordance with one embodiment of the present invention.

FIG. 9 illustrates a flowchart of an exemplary computer implemented process for controlling devices in a de-centralized and distributed storage environment in accordance with one embodiment of the present invention. The invention, however, is not limited to the description provided by flowchart 900. Rather, it will be apparent to persons skilled in the relevant art(s) from the teachings provided herein that other functional flows are within the scope and spirit of the present invention. Flowchart 900 will be described with continued reference to exemplary embodiments described above, though the method is not limited to those embodiments.

At step 902, a system controller 510 is configured to partition the devices in a network (a cloud computing network or an ATE framework) into a plurality of super-cells, wherein each super-cell comprises a plurality of member devices.

At step 904, one of the member devices of each super-cell is nominated as a nucleus device, wherein the nucleus device controls other member devices in the super-cell. The nucleus device may be designated by the system controller 501. Alternatively, the nucleus device may be elected through an election process where the member devices, based on some criteria, elect a nucleus device amongst themselves.

At step 906, configuration and other house-keeping commands are transmitted from the system controller 510 to the nucleus devices (e.g., 550 and 555) in the network associated with a specific task that the super-cell associated with a respective nucleus device needs to perform. The nucleus device is programmed to configure its member devices to perform the specific task.

At step 908, information is received from the nucleus device of each super-cell, wherein the results comprise information associated with the performance of the specific task from the member devices of a respective nucleus device.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method for controlling devices in a de-centralized environment, said method comprising:
    partitioning a plurality of devices in a network into a plurality of super-cells, wherein each super-cell comprises a subset of the plurality of devices, wherein the plurality of devices comprise devices under test (DUTs), wherein the network is an automated test equipment (ATE) framework comprising a system controller communicatively coupled with a plurality of primitives, wherein the plurality of primitives are communicatively coupled with and configured to test the plurality of devices, and wherein each of the plurality of primitives is configured to communicate and test a subset of the plurality of devices, and wherein a respective subset of the plurality of devices coupled to each primitive of the plurality of primitives is comprised within each super-cell;
    for each super-cell:
        nominating a device in the super-cell as a nucleus device, wherein the nucleus device in the super-cell controls member devices in the super-cell;
        transmitting commands associated with a specific task to the nucleus device, wherein the nucleus device communicates with the member devices and configures the member devices to perform a portion of the specific task; and
        receiving information from the nucleus device regarding performance of the specific task, wherein the information comprises information aggregated from the member devices of the super-cell associated with a performance of a respective portion of the specific task,
    wherein the partitioning, the nominating, the transmitting and the receiving are performed by the system controller, and wherein the system controller is configured to communicate command information with a respective nucleus device of the plurality of super-cells over a wired PCIe backbone.

2. The method of claim 1, wherein the plurality of devices comprise solid state devices (SSDs).

3. The method of claim 1, wherein the partitioning, the nominating, the transmitting and the receiving are performed by the system controller, and wherein the system controller is further configured to communicate command information with a respective nucleus device of the plurality of super-cells using node-hopping over a wireless network.

4. The method of claim 1, wherein the network is a cloud computing network and the plurality of devices are SSDs in the cloud computing network.

5. The method of claim 1, wherein the nominating comprises selecting the nucleus device based on a set of predetermined criteria.

6. The method of claim 5, wherein the set of predetermined criteria are selected from a group consisting of: processing power of a device, performance history of a device, storage capacity of a device.

7. The method of claim 1, wherein the nominating comprises selecting the nucleus device based on an election process between the member devices of the super-cell.

8. The method of claim 1, wherein the member devices are configured to communicate with the nucleus device through a wireless network.

9. The method of claim 1, wherein the nucleus device is configured to add additional member devices to its respective super-cell from neighboring super-cells from amongst the plurality of super-cells.

10. The method of claim 1, wherein for each super-cell, the method further comprises:
    responsive to a determination that a nucleus device is failing, promoting one of the member devices in the super-cell to a status of a nucleus device.

11. The method of claim 1, wherein the member devices are configured to communicate exclusively with the nucleus device of a respective super-cell.

12. A decentralized storage system comprising:
    a system controller operable to partition a plurality of devices in a network into a plurality of super-cells, wherein each super-cell comprises a subset of the plurality of devices, wherein the system controller comprises an electronic device that controls an operation of the plurality of devices, and wherein each super-cell comprises a plurality of devices, wherein the plurality of devices comprise devices under test (DUTs), wherein each super-cell from the plurality of super-cells is associated with a primitive in an ATE framework, wherein each primitive in the ATE framework is a discrete test module that fits into a test head and controls testing for a respective subset of the plurality of devices;
    a PCIe backbone operable to enable communication between the system controller and the plurality of super-cells, wherein the PCIe backbone comprises an electronic communication channel coupled to the system controller on a first end and the plurality of super-cells on a second end;

the plurality of super-cells, wherein each super-cell comprises a nucleus device nominated by the system controller from member devices in the super-cell and configured to:
  receive commands from the system controller associated with a specific task;
  apportion the specific task between the member devices in the super-cell;
  aggregate information from the member devices regarding a performance of the specific task; and
  communicate the information to the system controller, wherein the system controller is configured to communicate command information with a respective nucleus device of the plurality of super-cells over the PCIe backbone.

13. The decentralized storage system of claim 12, wherein the plurality of devices comprise solid state devices (SSDs).

14. The decentralized storage system of claim 12, wherein the network is a cloud computing network and the plurality of devices are SSDs in the cloud computing network.

15. The decentralized storage system of claim 12, wherein the nucleus device communicates with the system controller over a wireless network through node-hopping, and wherein the backbone is operable to communicate information pertaining to storage data.

16. A decentralized storage network comprising:
  a plurality of super-cells, wherein each super-cell comprises a plurality of member devices, and wherein a nucleus device elected from amongst the plurality of member devices is operable to communicate with and control the plurality of member devices;
  a system controller operable to communicate exclusively with an associated nucleus device of each of the plurality of super-cells, wherein the system controller exchanges configuration and command information with the associated nucleus device of each of the plurality of super-cells, wherein the plurality of member devices comprise devices under test (DUTs), wherein each super-cell from the plurality of super-cells is associated with a primitive in an ATE framework, wherein each primitive in the ATE framework controls testing for a respective super-cell; and
  a backbone operable to communicatively connect the plurality of the super-cells to the system controller, wherein the backbone is used to communicate command and configuration information between the system controller and the associated nucleus device of each of the plurality of super-cells and storage data between the system controller and the plurality of member devices in each of the plurality of super-cells;
  wherein the system controller communicates commands associated with a specific task to the associated nucleus device of each of the plurality of super-cells over the backbone, wherein the backbone is a PCIe backbone, and wherein the associated nucleus device configures member devices of a respective super-cell to perform a portion of the specific task, wherein the system controller is operable to nominate a device in each of the plurality of the super-cells as a nucleus device, and wherein the system controller is further operable to partition a plurality of devices in a network into the plurality of super-cells.

17. The decentralized storage network of claim 16, wherein member devices of each of the plurality of super-cells are configured to communicate exclusively with the associated nucleus device of a respective super-cell.

18. The decentralized storage network of claim 16, wherein the plurality of member devices comprise solid state devices (SSDs).

* * * * *